Feb. 23, 1932.                H. R. KRUEGER                1,846,211
                          VERTICAL DEEP HOLE DRILL
                   Filed March 29, 1929      5 Sheets-Sheet 2

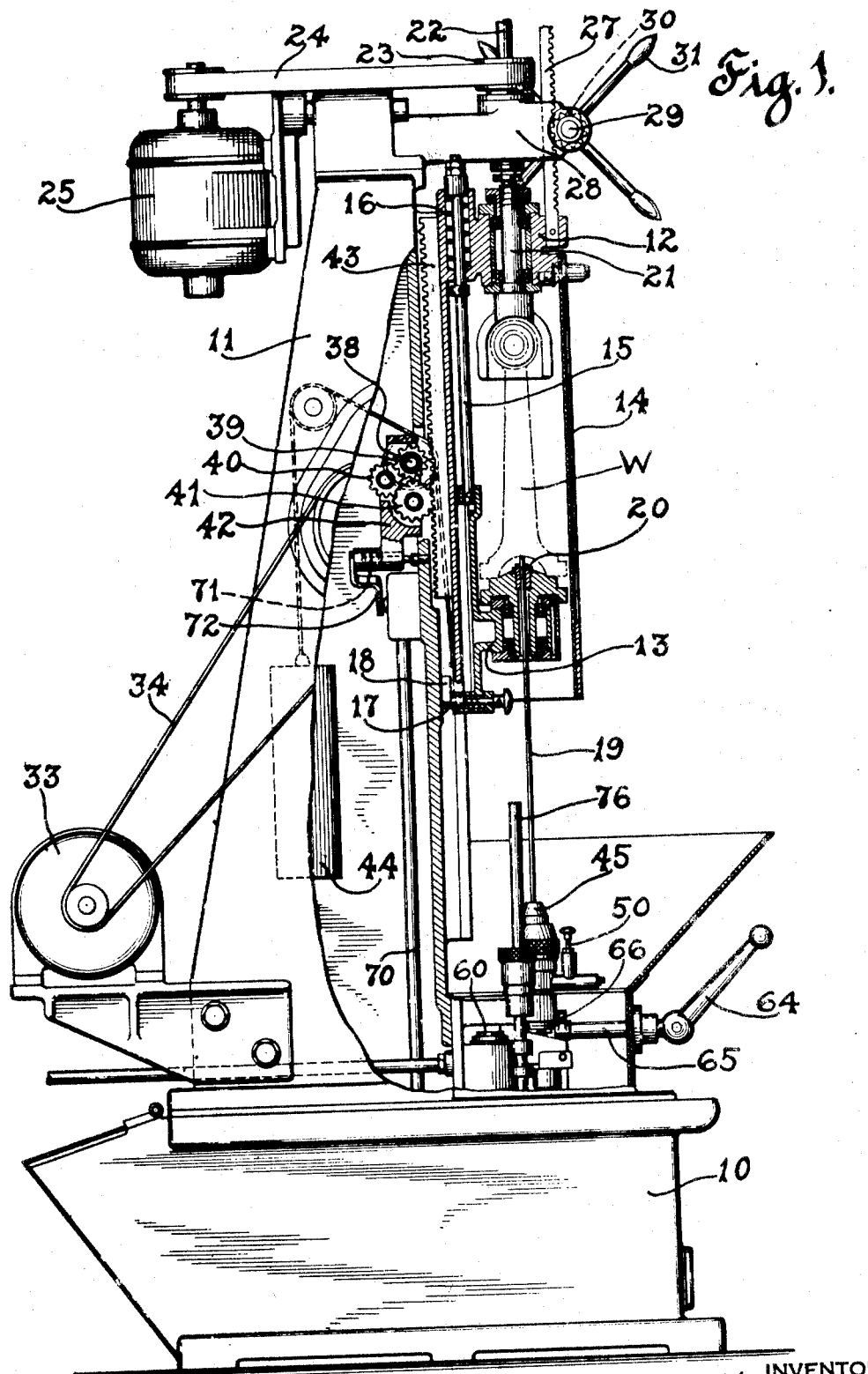

INVENTOR
H. R. Krueger
BY Joseph K. Schofield
ATTORNEY

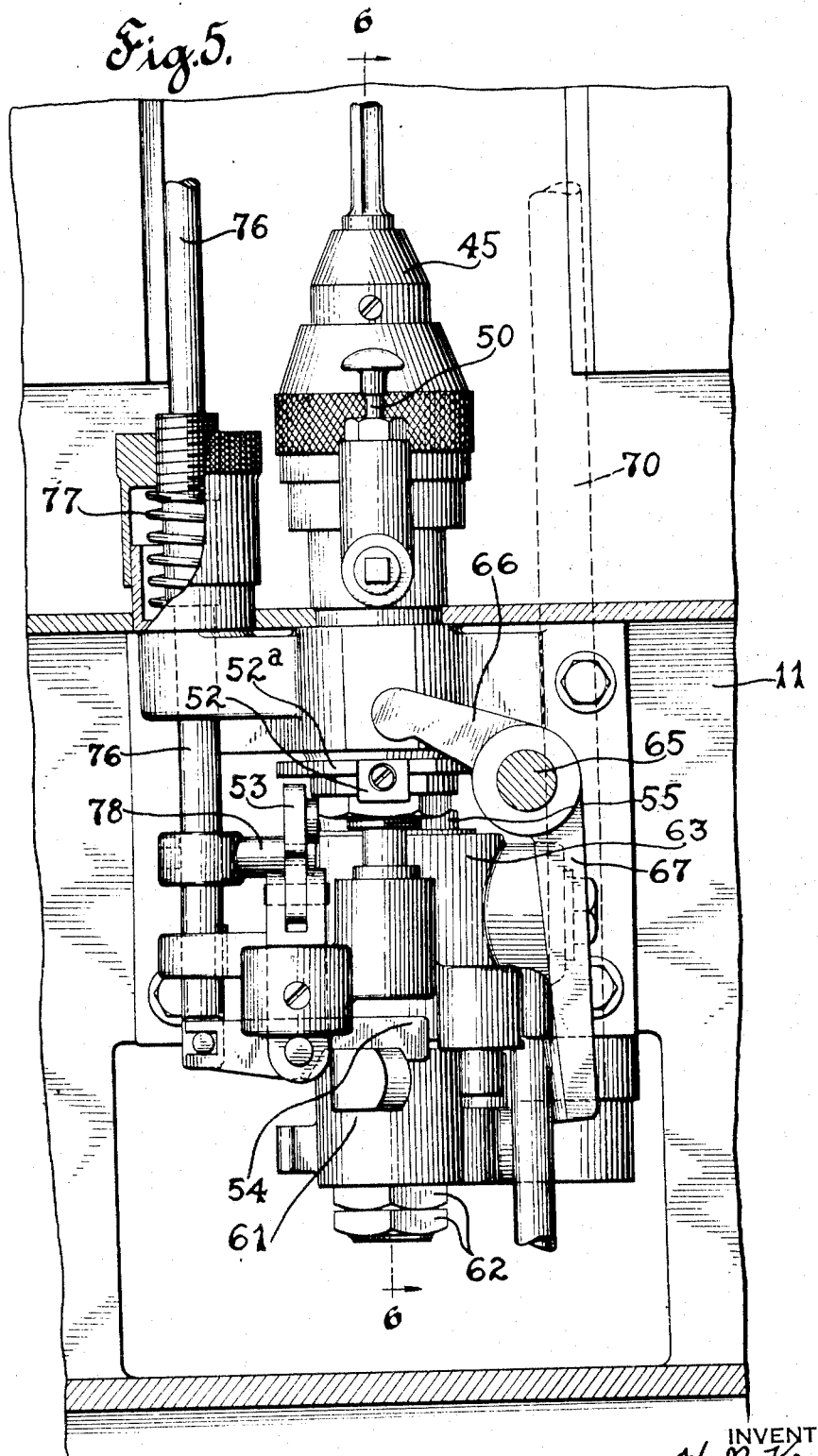

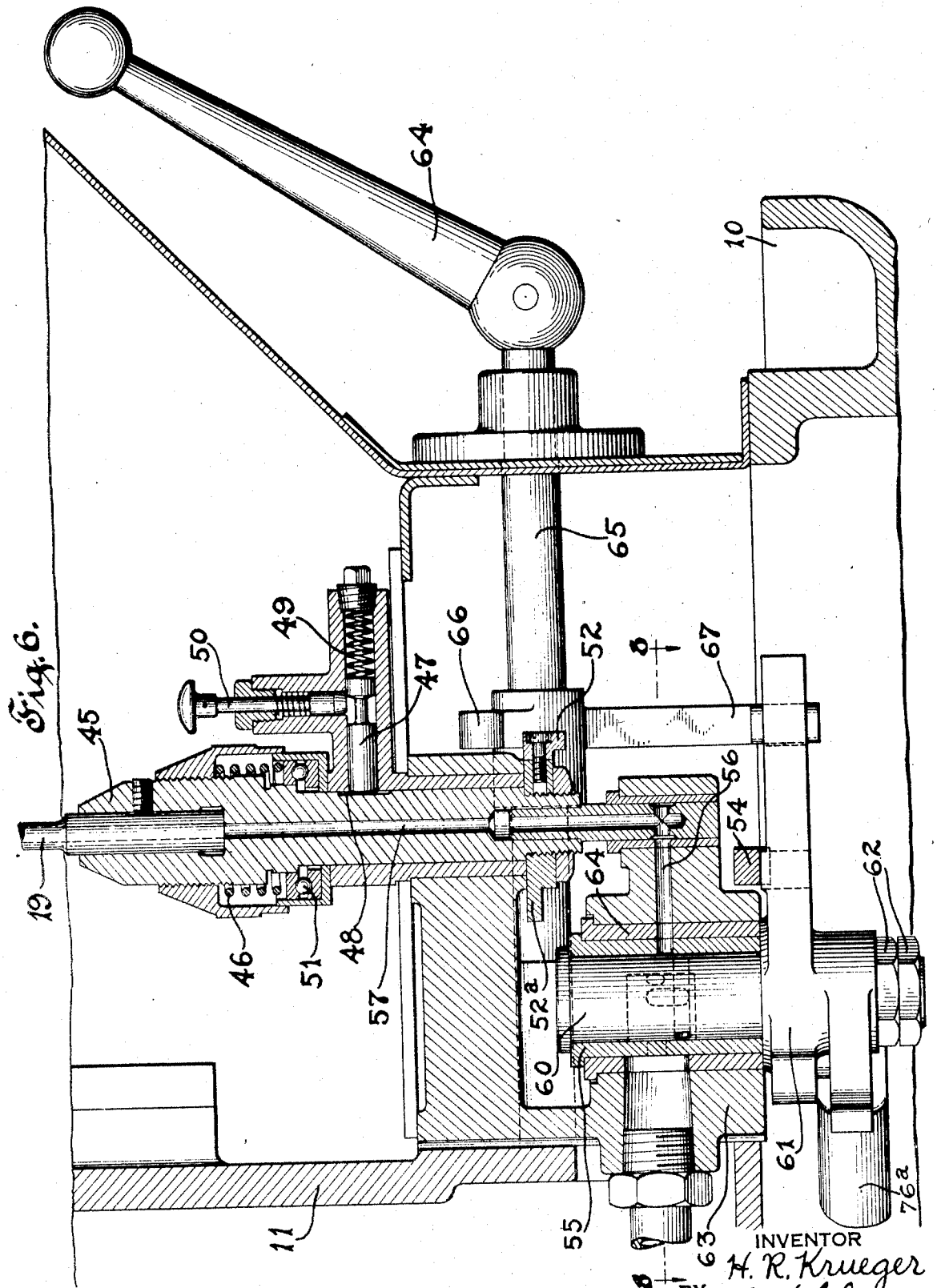

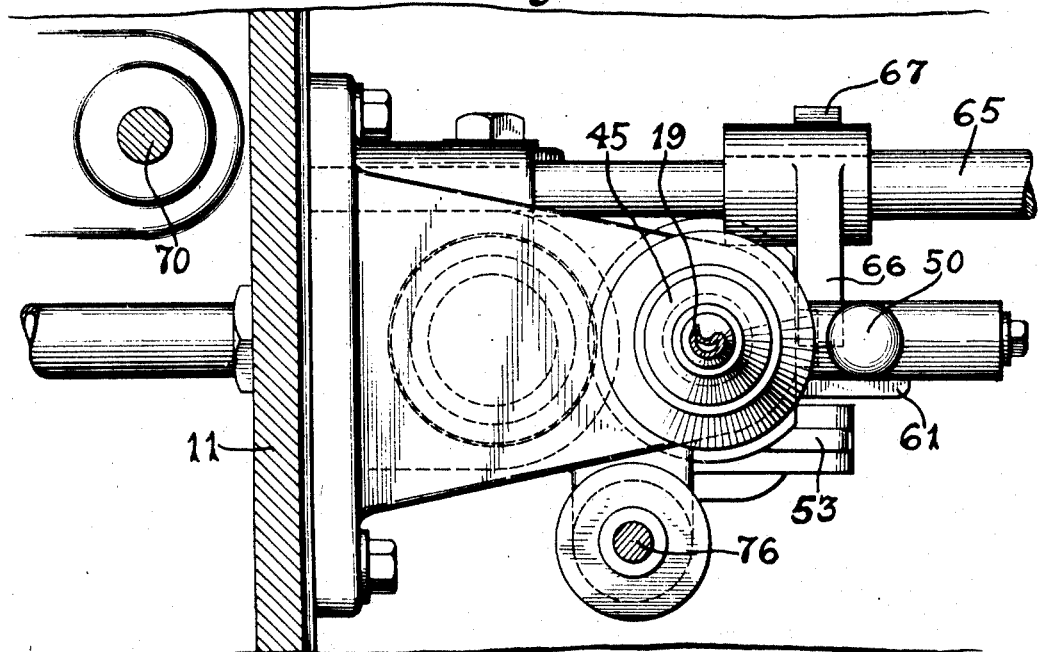
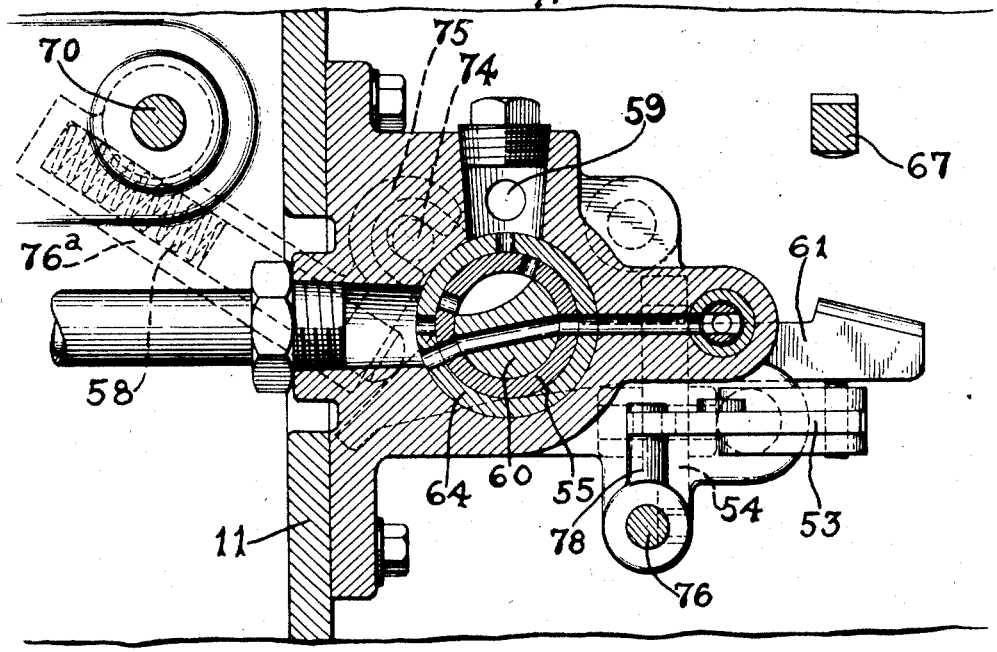

Patented Feb. 23, 1932

1,846,211

UNITED STATES PATENT OFFICE

HENRY R. KRUEGER, OF DETROIT, MICHIGAN, ASSIGNOR TO PRATT & WHITNEY COMPANY, OF NEW YORK, N. Y., A CORPORATION OF NEW JERSEY

VERTICAL DEEP HOLE DRILL

Application filed March 29, 1929. Serial No. 350,980.

This invention relates to drilling machines and in particular to a multiple spindle deep hole drilling machine.

An object of the invention is to provide an improved form of multiple drilling machine particularly designed for drilling long holes of small diameter, and to provide means for discontinuing operations at any one spindle or station whenever a drill point is subjected to an abnormal strain.

Another object of the invention is to provide a multiple spindle drilling machine in which the individual spindles support and rotate the work pieces to be drilled, and the spindles and work pieces are fed axially relative to a normally fixed drill by means adapted to be individually engaged and disengaged.

Another object of the invention is to provide a single operating lever, movement of which will start and stop feeding movement of the work head, rotation of the work, and supply of cutting fluid or lubricant to the drill.

Another object of the invention is to provide means to support a drill in a manner permitting it to be released to rotate freely with the work whenever an abnormal rotative or axial strain is placed upon it.

A still further object of the invention is to provide a trip for actuating the control lever when the feeding movement of the work has been completed or the operation discontinued due to an abnormal strain having been placed upon the drill.

A further object of the invention is to provide fluid conduits extending into the support for the drill and axially through the drill, ports or passages being adapted to be closed by a suitable valve when the drilling operation has been completed or the drill is released from operative position due to any abnormal condition during the drilling operation so that lubricant will be discontinued to the drill and will be by-passed back to a reservoir.

A further object of the invention is to provide rotating means for the work enclosed within a head having a removable front panel preferably slidably mounted relative to the head, the head providing means for rotating and feeding the work toward the drill.

With these and other objects in view my invention comprises the features of construction and operation set forth in the following specification and illustrated in the accompanying drawings.

In the accompanying drawings annexed hereto and forming a part of this specification, I have shown my invention embodied in a deep hole drilling machine, but it will be understood that the invention can be otherwise embodied and that the drawings are not to be construed as defining or limiting the scope of the invention, the claims appended to this specification being relied upon for that purpose.

In the drawings:

Figure 1 is a side elevation of the complete drilling machine, parts being shown in section to more clearly disclose their construction.

Fig. 5 is an elevation of the mechanism for supporting the drill and for releasing the drill at the end of the feeding movement of the drill or when the drill is subjected to an abnormal rotative or axial strain.

Fig. 6 is a vertical sectional view of the mechanism shown in Fig. 5 but taken at right angles to the view shown in Fig. 5.

Fig. 7 is a plan view of the mechanism shown in Figs. 5 and 6, and

Fig. 8 is a sectional view taken upon the plane of line 8—8 of Fig. 6.

Figure 3:
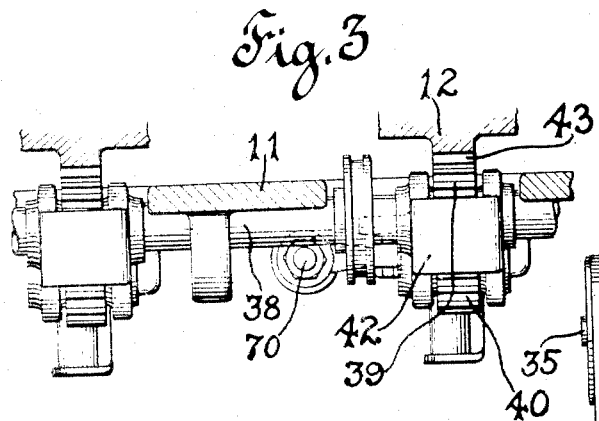
Fig. 3 is a detail horizontal view partly in section of the feeding mechanism for slowly advancing the work supporting and rotating head toward the drill.
Figure 2:
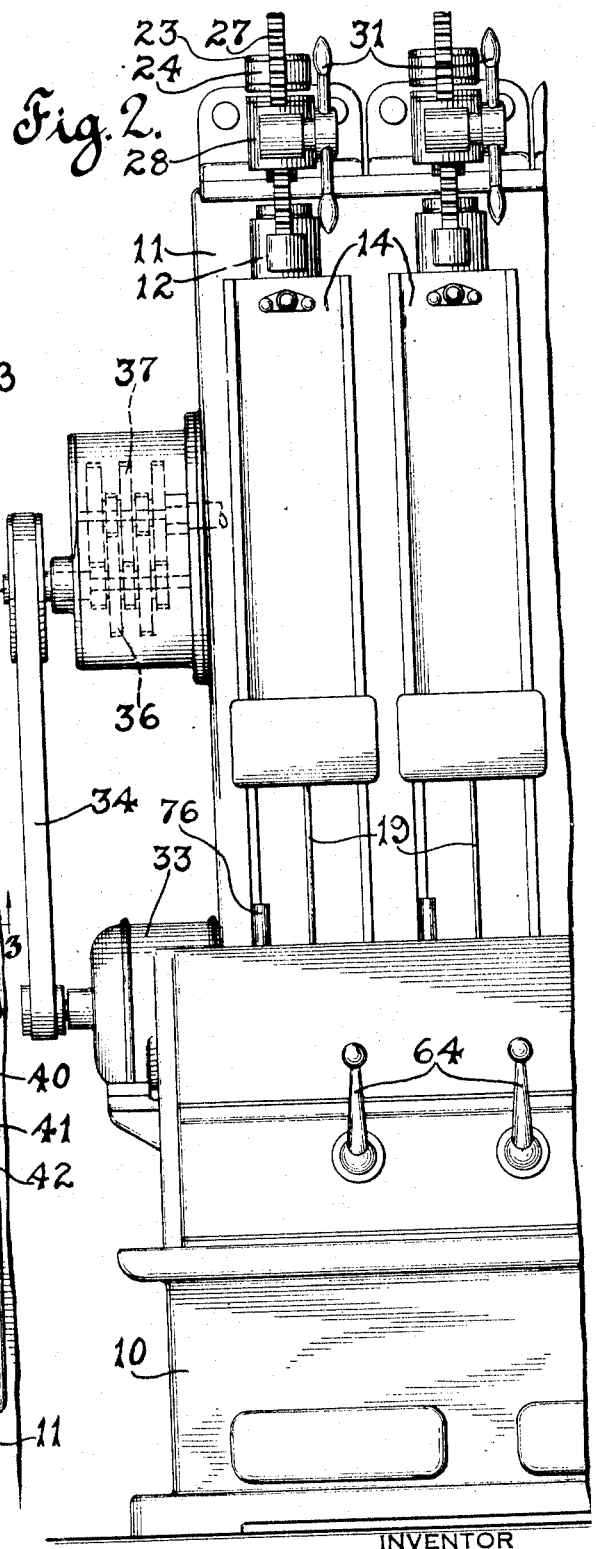
Fig. 2 is a front elevation of a portion of the machine showing two spindles of the machine.

In the above mentioned drawings I have shown but one embodiment of the invention which is now deemed preferable but it is to be understood that changes and modifications may be made within the scope of the appended claims without departing from the spirit of the invention.

Briefly and in its broadest aspect my invention comprises the following principal parts: first, a base, somewhat elongated, upon which is mounted a wide column having a plurality of vertical ways. On the column are mounted, so that they may be moved individually, a plurality of work supporting and rotating heads. Individual motors for each of these heads are provided adapted to be started and stopped by individual switches. These motors drivingly connect to spindles within the heads so that work pieces placed within the heads and connected to the spindles may be rotated at any desired speed. Feed mechanism is provided for each of the work supporting and rotating heads, the mechanism being individually operated for each spindle by being adapted to be moved to engaged or disengaged position. Means are provided to support the drill non-rotatably and in alignment with the work supporting spindle, preferably vertically below the work within a suitable chuck or other holding device. Trip mechanism is provided for this chuck or drill head so that when the feed mechanism has advanced the work head to a position to complete the drilling operation or any undue strain is placed on the drill the chuck is released so that the drill may freely rotate; simultaneously the feed mechanism is disengaged so that further movement of the work support is prevented. A cutting fluid or lubricant supplying means is provided forcing the fluid directly through the supporting chuck for the drill and axially through the drill, this supply also being controlled by the trip mechanism.

An oscillating lever is provided for each of the units of the machine, movement of which in one direction opens the valve for the cutting fluid, engages the feed mechanism and starts rotation of the work. Movement of the oscillating lever in the other direction by operation of the trip mechanism disengages the feeding and rotating means and closes the valve for the cutting fluid.

Referring more in detail to the figures of the drawings, I provide the base 10 with a wide column 11. On the front face of this column are mounted a number of similar work supporting heads 12 slidable upon suitable ways formed on the column 11. Any number of work heads 12 may be provided and as they are all similar or identical, but one will be described.

Each of these heads 12 comprises a body member directly engaging the ways on the front vertical surface of the column 11 and an auxiliary member 13 movable vertically relative to the main body member. This movement of the auxiliary member 13 enables the work pieces W to be placed in position and held properly therein by means engaging opposite ends when the two members 12 and 13 are brought together into operative position. This will be clear from an inspection of Fig. 1. The front of the work head 12 is closed by a slidable panel 14 movable to completely enclose the work W being drilled or to expose it for removal and substitution of other work pieces.

A rod 15 is attached to the lower or auxiliary work head 13 and is connected to the upper or main work head 12 by means of a helical spring 16. This spring 16 has one end engaging the end of a recess formed within the main work head. The other end of the spring 16 engages a collar on the rod 15. A spring finger or projection 17 mounted in the lower or auxiliary head 13 engages an abutment 18 outstanding from the front face of the column 11. When the work heads 12 and 13 have been moved upward until this finger or projection 17 engages the abutment 18, further movement of the main work head 12 to further separate the head 12 from the auxiliary head 13 compresses the helical spring 16. It is this pressure of the spring 16 normally holding the two work heads 12 and 13 toward each other that serves to retain the work piece W in engagement with the work heads.

The plunger or projection 17 is mounted so that it may be retracted and permit movement of the lower head 13 upward past the abutment 18. This additional upward movement of the lower head 13 which also positively moves the main or upper head 12 due to a collar on the rod 15 just below the upper work head 12, is made use of to remove and insert drills 19 in their operative positions extending vertically through bushing 20 inserted within the lower head 13.

Within the work head 12 is a driving spindle 21 rotatably mounted within suitable bearings. This spindle 21 is provided with a spline shaft 22 on its upper end which is engaged by a driving pulley 23 driven by means of a belt 24 and the motor 25 shown in Fig. 1. To start and stop rotation of a spindle 21 and the work blank W being drilled, a switch is moved to start and stop the individual motor 25 driving that particular spindle.

To vertically lower or raise the work support 12 by hand for preliminary adjustments when setting the machine in operation or removing finished work therefrom, a rack 27 is secured to a portion of the work support 12 and extends through an upper bracket 28 within which the driving pulley 23 for the spindle 21 is mounted. A cross shaft 29 having a pinion 30 and hand wheel 31 is mounted within this bracket 28 so that by rotating the hand wheel 31 the work support 12 is raised or lowered.

In order to feed the work supports 12 and 13 and their work pieces W individually I provide a common feed driving means and individual means mounted adjacent each spindle to engage and disengage this mechanism. This feed mechanism comprises mechanism as shown in Figs. 1, 2, 3, and 4. A motor 33, preferably mounted in the lower portion and at one end of the column 11, is drivingly connected by a belt 34 to a shaft 35 within a housing 36 at one end of the column 11. Within this housing 36 is a speed reducing mechanism comprising gears 37 of any well-known type so that the shaft 35, driven at a relatively high speed, drives the feed shaft 38, shown most clearly in Fig. 1, at an extremely low rate. This feed shaft 38 extends horizontally and completely across the column 11.

Individual pinions 39 are splined to this shaft 38 and are drivingly connected with an idler 40 and a second gear 41 mounted upon shafts or studs in a swinging frame 42. This pivotal or swinging frame 42 will be seen clearly in Fig. 1; the axis about which this member swings is the feed shaft 38. Movement of the frame 42 and the gears 40 and 41 to the right about the axis of the feed shaft 38 (as seen in Fig. 1) will engage the gear 41 with the teeth of a rack 43 attached to the upper or main work support 12. Similarly movement to the left of the second gear 41 will disengage the gear from the teeth of the rack 43 and permit manual movement of the work support 12 in either direction.

The weight of the work supports 12 and 13 and parts associated therewith preferably may be counterbalanced by suitable weights 44 within recesses in the column 11 in order to facilitate manual movements of the work supports 12 and 13. Each weight 44 preferably also may more than counterbalance the work supports and parts mounted thereon at one spindle of the machine so that as soon as the feed mechanism is disengaged at the end of a drilling operation the work supports 12 and 13 will move upwardly to their inoperative or loading positions without being required to be moved upwardly by manual means.

In operation the drill 19 is fixed in vertical position within a chuck 45 presently to be more fully described and does not move axially nor rotate during the drilling operation. The drill 19 is preferably guided at its upper end by the bushing 20 rotating with the work W and mounted within the lower work head 13. The chuck 45 within which the drill 19 is mounted and suitably secured at its lower end is adapted to be moved a short distance axially against the pressure of a spring 46 shown clearly in Fig. 6. This spring 46 is strong enough to support the drill 19 against the normal pressure of the drilling operation but permits the chuck 45 and drill 19 to move downward a short distance when normal pressures are exceeded. The chuck 45 is also adapted to be freely rotated when a plunger 47 bearing upon a flattened portion 48 of the chuck spindle is forced outwardly against a spring 49. This spring 49 when bearing upon the flattened portion is sufficient to prevent rotation of the drill 19 under normal conditions of operation. It will be understood that in drilling operations the drill 19, which is extremely long and slender, is subjected to numerous and irregular strains which may be sufficient to break the drill. Mechanism therefore is supplied to immediately release the drill 19 so that it will rotate with the work W when it is subjected to any abnormal strain.

Obviously the strains may be either to twist the drill or to axially compress the drill. When the rotative or twisting pressure applied to the drill, due to the resistance to the cutting operation upon the work, exceeds a predetermined maximum, the chuck 45 and drill 19 rotate so that plunger 47 bearing against a flattened portion of the drill supporting chuck 45 is forced outwardly and is held in its outward position by a second plunger 50 engaging over an abutment formed on the first plunger 47. With this plunger 47 released from engagement the drill supporting member or chuck 45 is free to rotate, an anti-friction bearing 51 being provided to facilitate the rotation of the drill 19 and its chuck 45. Similarly, when the axial compression strains on the drill 19 and chuck 45 exceed a maximum the drill supporting chuck 45 moves downwardly against the pressure of the coil spring 46.

Either of these movements, that is axial or rotative movement of the chuck 45, operates releasing mechanism for the feed mechanism and rotating means for the work W. These will now be described. As soon as a rotative pressure is exceeded sufficiently to release the retaining plunger 47 for the drill chuck 45 rotation of the chuck and drill is started. A cam plate 52 mounted on the lower end of the chuck 45 for the drill 19 is also rotated and engages a trip lever 53 which releases a catch 54 shown in Fig. 5. This release of the catch oscillates a valve in the lubricant supplying means to shut off lubricant from the drill 19 and also stop the feed mechanism and work rotating means.

The catch 54 is released through rotation of the chuck 45 and engagement of cam plate 52 rotating with the chuck 45 engaging the pivotally mounted plate 53. When the drill 19 is forced downward against the pressure of spring 46 the plate 52ª on which the cam plate 52 is mounted strikes the uppermost end of member 53. In either case the pivoted plate or member 53 is forced downward which forces rod 76 downward by forcing the short arm 78 secured to rod 76 and on which member 53 rests downward. At the lower end of the rod 76 the catch 54, which is in the form of a pivoted lever, is flexibly connected.

The valve controlling the lubricant is shown in Fig. 8. Rotation of the valve member 55, controlling conduits for the lubricating means, interrupts these conduits and prevents free passage of fluid into the drill 19 through openings 56 and 57. These parts are shown in operative position as when supplying lubricant to the drill. As soon as the catch 54 is released, the valve member 55 is oscillated by spring 58, the operation of which will presently be more fully described, which by-passes the lubricant into exhaust conduit 59 from where it may flow back into a suitable reservoir. As shown in Figs. 6 and 8 the valve 55 is held in place by a stud or bolt 60 suitably recessed for lubricant channels and held in fluid tight relation to the member 61 by locking nuts 62. Surrounding the valve 55 and within the portion of the frame 63 is a bushing 64 driven therein and within which the valve 55 freely oscillates.

To set the member 61 so that the catch 54 will be engaged, the lubricant supplied to the conduit 56, the feed of the work spindle downward started and the work rotated, a hand lever 64 is provided. This hand lever 64 is secured to a rearwardly extending shaft 65 having a lever member thereon. This member has a short oblique arm 66 and depending long arm 67. Oscillation of the hand lever 64 in one direction will force the arm 67 against an extended portion of the member 61 and move the member 61 angularly to a position permitting engagement of the catch 54. Oscillation of the hand lever 64 in the opposite direction engages the shorter arm 66 with the plate 52ª forcing it downward to disengage the catch, etc., as above described.

Figure 4:
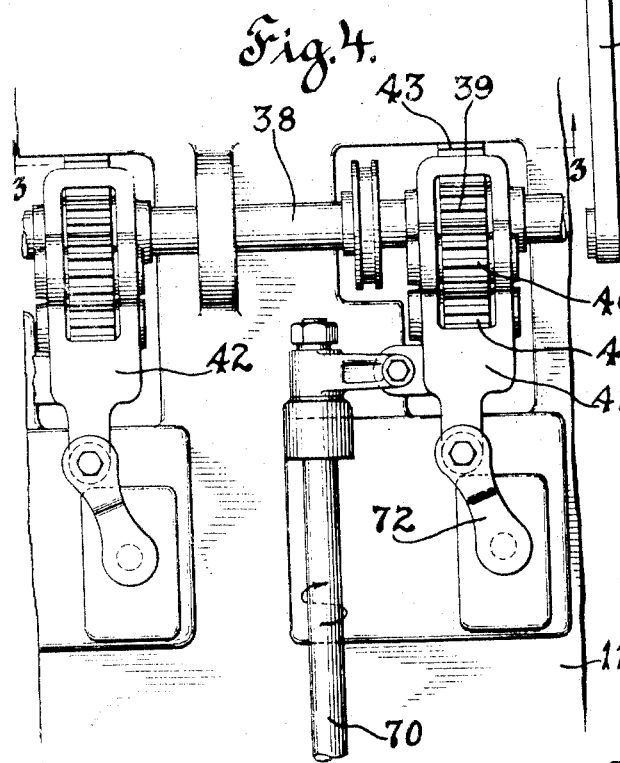
Fig. 4 is a rear elevation of the mechanism shown in Fig. 3.

The feed mechanism for the drill heads 12 and 13 is disengaged by oscillation of a vertical shaft 70, one being provided for each work support shown clearly in Figs. 1 and 4. Oscillation of this shaft 70 in one direction permits a spring 71 to oscillate the pivoted or swinging feed members 42 to their disengaged or inoperative positions. This movement disengages the feed pinion 41 from the rack 43, thus stopping further feed movement. Also movement of this swinging member 42 to its disengaged position permits outward movement of a spring operated switch member 72 controlling the individual motor 25 for driving one of the spindles 21. The rotation of the spindle 21 will therefore stop. With the feed mechanism and spindle rotation rendered inoperative at any one station or unit of the machine, examinations may be made of the work drilled, etc., work removed and replaced or a new drill replaced if one has become broken. It will be understood that similar releasing mechanism is provided for each drill 19, each mechanism at the different stations being independently operated so that stopping of operation upon one work piece will not interfere with the progress of drilling taking place upon other work pieces.

Oscillatory movement of the vertical shaft 70 in the opposite direction serves to engage the gear 42 with the rack 43 to start the feed mechanism for the spindle 21 and also depresses the switch operating member 72 to start the motor 25. Movement of the shaft 70 in either direction is effected by movement of the member 61.

By reference to Figs. 6 and 8 the connection between the shaft 70 and the member 61 will be seen. Oscillation of member 61 when the catch 54 is released oscillates a pin 74 mounted on the member 61 which is engaged by a yoke member 75 forming an extension of a member 76ª secured to the lower end of the vertical shaft 70. Oscillation of the member 61 therefore oscillates the shaft 70 in the opposite direction. Also mounted in the member 76ª is the spring 58 previously referred to. A plunger forced outwardly of the member 76 by spring 58 engages against a short arm on the member 61. As soon, therefore, as the catch 54 is released spring 58 acts to oscillate the member 61 and through pin 74 also oscillates the rod 70.

Means are also provided to stop feeding movement by disengaging the feed mechanism of the work heads 12 and 13 when the drilling operation has been completed. This is effected by a part of the mechanism above described. Vertical rod 76 is normally spring held by coiled spring 77 toward its upper position as shown in Fig. 5. The upper end of this rod 76 is adapted to be engaged by a surface on the lower part of the work support 13.

As soon as the lower face of the work support 13 contacts with the upper end of this rod 76, further feeding movement of the work member will force the rod 76 downward and oscillate the pivoted lever carrying the latch 54, thus disengaging the latch member 54. As soon as this latch 54 is disengaged the member 61 is oscillated by spring 58 which stops the flow of lubricant and, through oscillation of shaft 70, disengages the feed and stops rotation of the motor 25, all as above described.

What I claim is:

1. A drilling machine comprising in combination, a support, a work head, means to move said head along said support, an auxiliary head movable upon and relative to said first head, work engaging and rotating means on one of said heads, work engaging means on the other of said heads rotatable with said work, a front panel slidably mounted upon said first head and adapted to completely enclose a work piece when in its closed position, feeding means engaging said first head for advancing said heads along their support, a stop limiting retrograde movement of said heads, manual means to separate said heads when said first head is in contact with said stop, and means to move said stop to disengaging position, whereby said heads may be moved beyond their normal limited position.

2. A drilling machine comprising in combination, a support, a work rotating and supporting head thereon, means to advance said head along said support, a drill chuck and drill normally maintained on said support against rotation and axial movement, means to supply lubricant to said chuck and through said drill, a latch adjacent said chuck, a rod engaged and forced axially when said head has been advanced to a position completing a drilling operation, movement of said rod serving to disengage said latch, and means operated by movement of said latch and rod to stop advancing and rotative movements of said head and to stop the supply of lubricant to said chuck and drill, and unitary means to reset said latch, re-engage said feeding mechanism for said head and open the supply of lubricant for said drill.

3. A drilling machine comprising in combination, a support, a work rotating and supporting head thereon, means to advance said head along said support, a drill chuck and drill normally maintained against rotation and axial movement, means to supply lubricant to said chuck and through said drill, a rod engaged and forced axially when said head has been advanced to a position completing a drilling operation, movement of said rod serving to disengage said latch, means permitting axial and rotative movements of said chuck when the axial or rotative force upon the drill exceeds a predetermined maximum, and a latch adjacent said chuck disengaged either by axial movement of said rod or axial or rotative movement of said chuck to disengage the advancing and rotating means for said head and stop the supply of lubricant to said chuck and drill.

In testimony whereof, I hereto affix my signature.

HENRY R. KRUEGER.